May 10, 1966 J. W. GRIFFITH 3,250,608
METHOD AND APPARATUS FOR THE VACUUM PURIFICATION OF MATERIALS
Filed Nov. 7, 1963 4 Sheets-Sheet 1
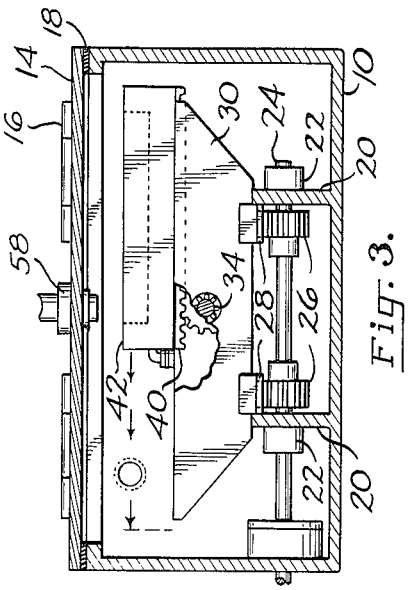
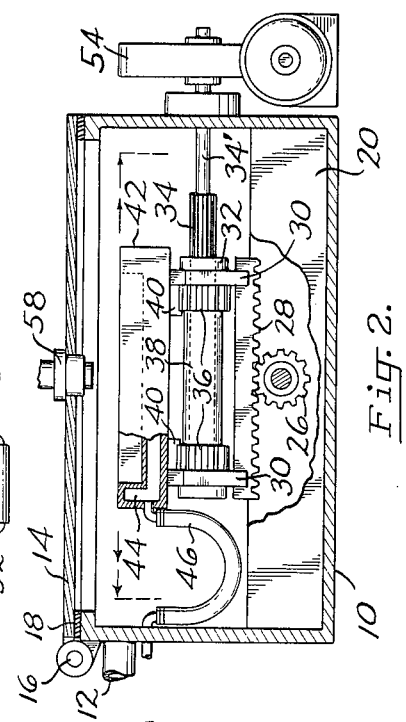
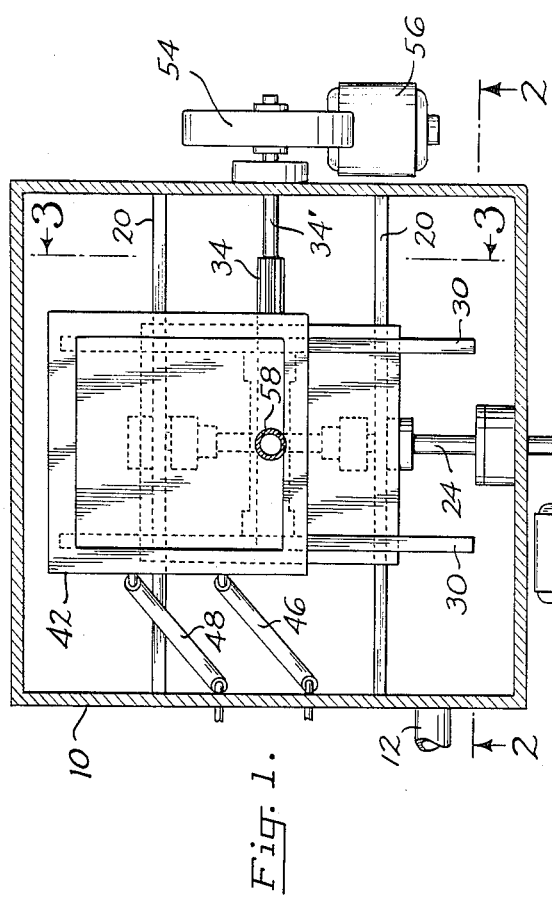
Joseph W. Griffith
INVENTOR.
BY *Oliver D. Olson*
Agent

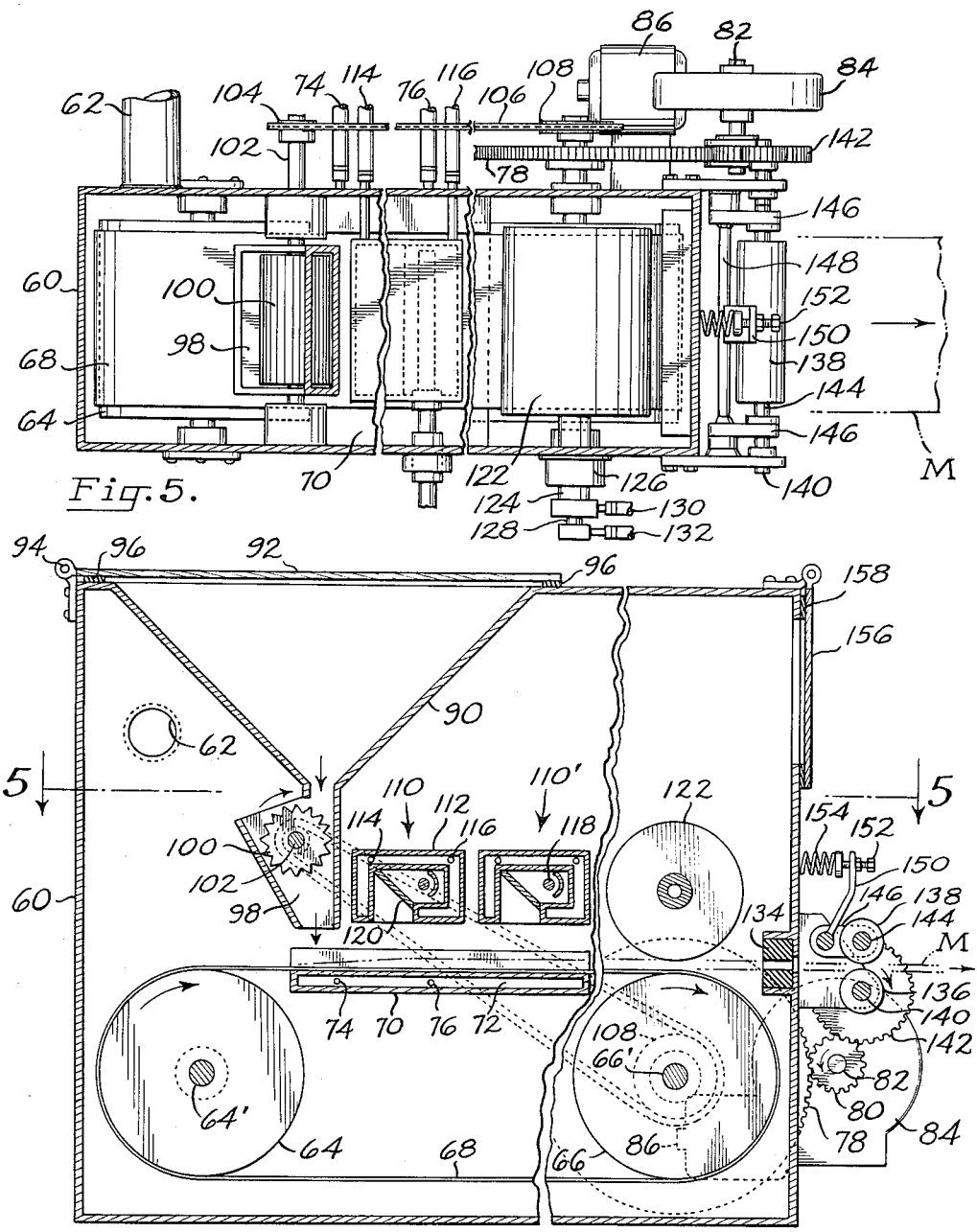

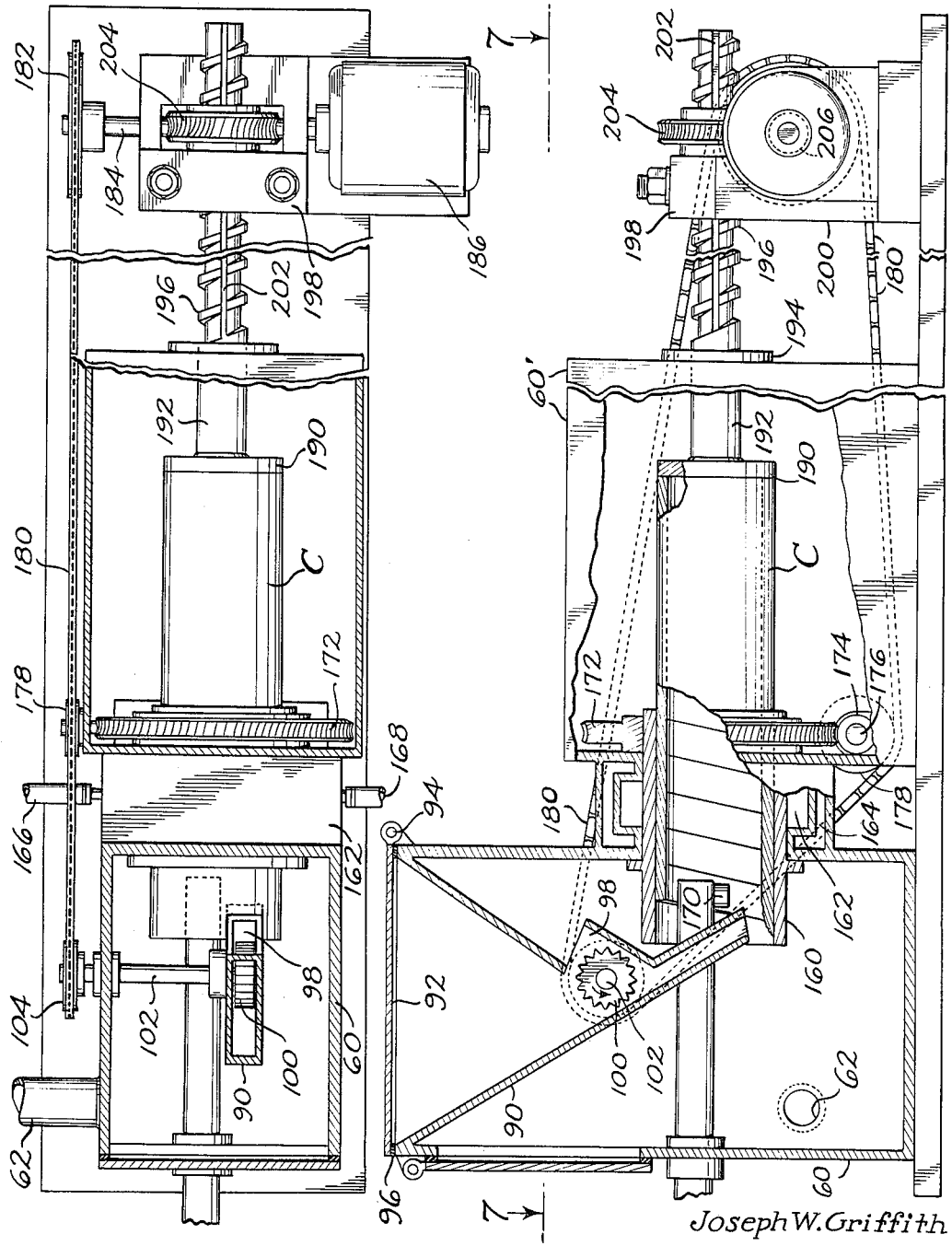

May 10, 1966  J. W. GRIFFITH  3,250,608
METHOD AND APPARATUS FOR THE VACUUM PURIFICATION OF MATERIALS
Filed Nov. 7, 1963  4 Sheets-Sheet 4

Joseph W. Griffith
INVENTOR.

BY *Oliver D. Olson*

Agent

United States Patent Office
3,250,608
Patented May 10, 1966

3,250,608
METHOD AND APPARATUS FOR THE VACUUM PURIFICATION OF MATERIALS
Joseph W. Griffith, Portland, Oreg., assignor to Electro-Glass Laboratories, Inc., Beaverton, Oreg., a corporation of Oregon
Filed Nov. 7, 1963, Ser. No. 323,197
10 Claims. (Cl. 75—10)

The present application is a continuation-in-part of my patent application filed September 26, 1960 under Serial No. 58,296 and entitled Method and Apparatus for the Vacuum Purification of Refractory Metals, now abandoned.

This invention relates to the purification of materials characterized by having vapor pressures of less than one atmosphere at their respective melting points.

Although the present invention has particular utility in the purification of refractory metals such as tungsten, titanium, zirconium, hafnium, columbium, tantalum, molybdenum and others, as well as alloys thereof, it is equally applicable to the purification of all other materials having vapor pressures of less than one atmosphere at their respective melting points. Exemplary of these materials are metals and their alloys, in addition to the aforementioned refractory metals, semi-conductor materials such as silicon, and electrical insulating materials such as the oxides of aluminum, magnesium and others.

It is the principal object of the present invention to provide a method and apparatus by which to produce purified materials of the class described, in slab, sheet, or tubular form, most suitable for ultimate usage.

Another important object of this invention is the provision of a method and apparatus by which to purify materials of the class described, in which the material initially is in the form of discreet particles or is performed in the shape of a slab, sheet or tube.

A further important object of the present invention is the provision, in apparatus employing electron bombardment as the means for melting the material to be purified, of an improved electron emitter which is not subject to deterioration or damage by the accumulation of spatter.

Figure 9:
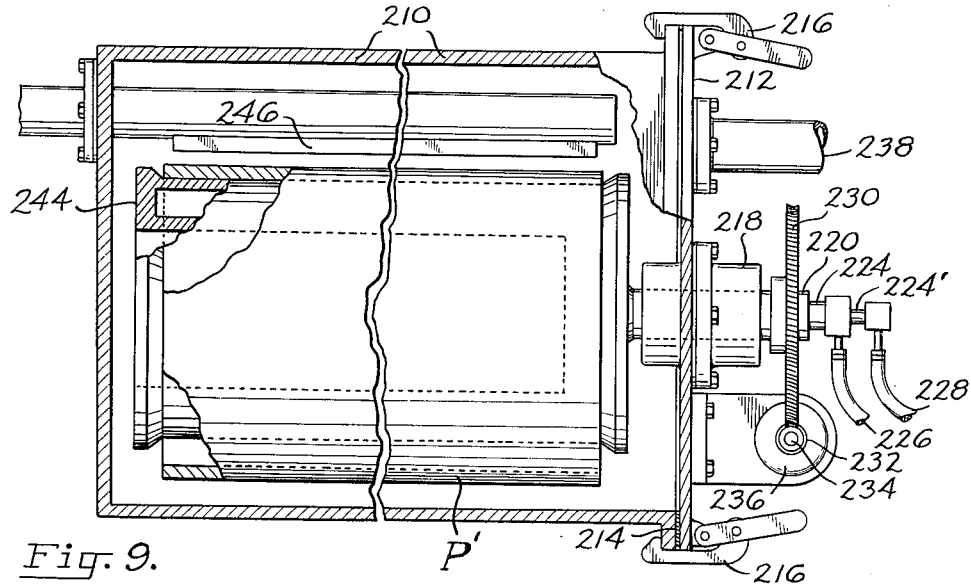
Figure 8:
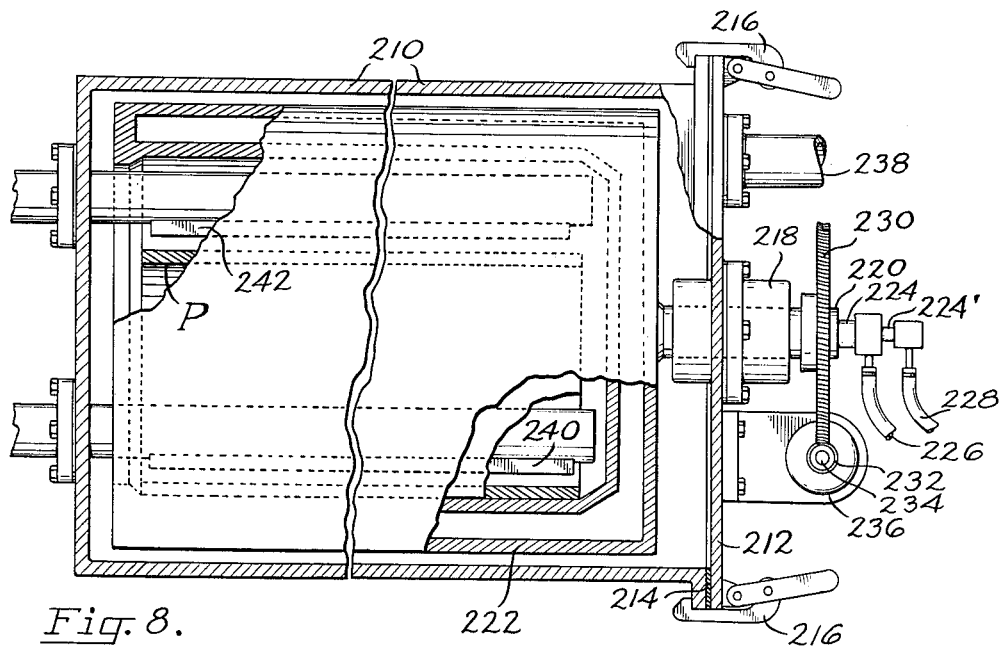

The foregoing and other objects and advantages of this invention will appear from the following detailed description, taken in connection with the accompanying drawings in which:

FIG. 1 is a plan view, partly in section, of purifying apparatus embodying features of this invention;
FIG. 2 is a view in vertical section taken along the line 2—2 of FIG. 1;
FIG. 3 is a view in vertical section taken along the line 3—3 of FIG. 1;
FIG. 4 is a foreshortened view in vertical section of a modified form of purifying apparatus embodying features of the present invention;
FIG. 5 is a foreshortened view in horizontal section taken along the line 5—5 of FIG. 4;
FIG. 6 is a foreshortened view in vertical section of a further modified form of purifying apparatus embodying features of this invention;
FIG. 7 is a foreshortened view in horizontal section taken along the line 7—7 of FIG. 6;
FIG. 8 is a foreshortened plan view, partly in section, showing a still further modified form of purifying apparatus embodying features of the present invention; and
FIG. 9 is a foreshortened plan view, partly in section, showing still another modified form of purifying apparatus embodying features of the invention.

In its broad concept, the present invention involves the melting, in vacuum, of successive portions of a total mass of the material to produce a purified mass of the material in the desired shape. As the molten zone progresses over the entire area of the mass, volatile impurities are vaporized and non-volatile impurities are carried along with the molten zone. Preceding portions of the material, previously melted and thus previously constituting the molten zone, resolidify and ultimately produce a continuous mass of purified material in the shape desired.

Heating of the material preferably is accomplished by electron bombardment, and in this respect the present invention also involves the provision of an electron gun in which a second cathode is utilized both as a uni-potential source of electrons and as a shield for protecting the resistively heated primary cathode against the accumulation of spatter.

In the embodiment illustrated rather schematically in FIGS. 1, 2 and 3 the apparatus includes a vacuum chamber 10 communicating through vacuum conduit 12 with any desirable form of evacuating system (not shown) by which to reduce the pressure in the chamber to less than one micron of mercury. Access to the interior of the chamber is provided by the lid 14 which is secured pivotally to the chamber by the hinge 16. A vacuum seal 18 is interposed between the chamber and lid to permit evacuating the chamber when the lid is closed.

A pair of spaced rails 20 extend across the bottom of the chamber 10 and support the bearings 22 for the shaft 24. A pair of pinion gears 26 are mounted on the shaft 24, and these gears engage associated racks 28 which are secured to a pair of spaced upper rails 30 which extend substantially normal to the lower rails 20. The upper rails support bearings 32 for the splined shaft 34, which, in turn, slidably supports the pinion gears 36. These gears are spaced apart by the interposed sleeve 38, and engage associated racks 40 supported upon the underside of a melting tray 42.

The tray is formed with hollow peripheral walls and bottom, and its hollow interior 44 communicates with the flexible water inlet and outlet conduits 46, 48 respectively. These conduits are of sufficient length to permit movement of the tray throughout its range, as described more fully hereinafter. The water conduits function to circulate cooling water through the hollow walls of the tray, thus permitting the tray to be constructed of a metal, such as copper, which has a melting point below that of the material to be melted in the tray.

One end of shaft 24 projects through the chamber wall and a bearing supported thereon, and is connected to the output of gear reduction unit 50. The input of this unit is connected to the driven shaft of the electric drive motor 52. Thus, operation of the motor effects rotation of the shaft 24 and corresponding movement of the racks 28 and melting tray 42 supported thereon, to one of its limits in the longitudinal direction of the chamber 10, i.e. toward the left or right as viewed in FIG. 2. Reversible limit switches or well known timer devices may be used to reverse the electric motor or gear reduction unit to move the tray to its opposite limits.

One end section 34' of the splined shaft is reduced to circular cross section and projected outwardly through the chamber wall and a bearing supported thereon. The outer end of this shaft is connected to the output shaft of a gear reduction unit 54, the input of which is connected to the driven shaft of the electric motor 56. Operation of this motor effects rotation of the shaft 34 and pinion gears 36 thereby causing the racks 40 and the melting tray 42 supported thereon to be moved to one of its limits in the transverse direction of the chamber, i.e. toward the left or right as viewed in FIG. 3. Reversal to the opposite limit may be effected in manner similar to the operation of motor 50, previously described.

Movement of the melting tray between its limits longitudinally within the chamber occurs simultaneously with movement of the tray in the transverse direction of the chamber. The ratio of speeds of these movements may be varied, as desired by such means as controlling the speed of the drive motors or the gear ratio of the reduction units.

Mounted above the melting tray, for example in the chamber lid 14, is an electron beam gun 58. This gun is connected in well known manner to a source of electric supply (not shown), and directs a spot beam of electrons toward the melting tray 42. Thus, a quantity of material within the melting tray is subjected to electron bombardment sufficient to cause the material to melt. The quantity of material within the tray is scanned by the electron beam spot as the melting tray is moved longitudinally and transversely within the chamber. This effects progressive melting of the material over the area of the tray, and as the electron beam spot moves relative to the surface area of the material, a molten spot of material moves with it. Volatile impurities in the material are vaporized in the area of this moving spot of molten material and carried from the chamber 10 through the evacuating system.

In addition, this moving spot of molten material tends to entrap non-volatile impurities, which generally are more soluble in the liquid phase than in the solid phase. Thus, substantially all of the non-volatile impurities are concentrated in the spot of molten material which, upon completion of its trace over the entire area of the material by movement of the tray, becomes concentrated in one corner or along one edge of the melted material. This corner or edge may be removed from the finished slab after removal of the latter from the chamber.

The material within the tray may be subjected to repeated scannings of the electron beam, if desired or necessary to assure maximum purification. In addition, the slab may be turned over in the tray and scanned by the electron beam, to insure complete melting and purification of the slab throughout its thickness.

The material to be melted may take the initial form of a slab suitable dimensioned to be received within the tray, or it may be in the form of granules or other pieces of diverse shapes and sizes. In the case of refractory metal, it is desirable that the purified slab have a thickness not exceeding two inches in order to provide it with characteristics of strength and ductility which permit it to be fabricated by conventional procedures into ultimate forms suitable for practicable usage. Moreover, it is preferred for most refractory metals that the purified slab have a thickness not exceeding about one inch, for it has been determined that optimum grain size is achieved by restricting the slab thickness to this maximum.

In the embodiment illustrated in FIGS. 4 and 5, the chamber 60 is evacuated through the conduit 62 connected to a vacuum pump (not shown), and the chamber encloses a pair of spaced rolls 64, 66 supported rotatably on the shafts 64′, 66′, respectively. The rolls support the endless metal belt 68, the upper working stretch of which passes slidably through the open ended tray 70, between the upwardly projecting side walls of the latter. The side walls and bottom of the tray are hollow and the internal space 72 communicates with the inlet and outlet water conduits 74, 76 which serve to cool the tray and the portion of the endless belt which is in contact therewith.

The shaft 66′ supporting the driven roll 66 also mounts the gear 78 which meshes with the gear 80 attached to the output shaft 82 of the gear reduction unit 84, the input of the latter being connected to the driven shaft of the electric motor 86. Thus, activation of the motor effects movement of the belt 68, the working stretch of which travels in the outfeed direction, toward the right in FIG. 4.

The chamber also houses a hopper 90, the upper end of which is closed by the lid 92 connected pivotally to the chamber by means of the hinge 94. A vacuum seal 96 is interposed between the hopper lid and the chamber wall, to permit evacuating the chamber and hopper.

The lower end of the hopper forms a constricted outlet which communicates with a feed chamber 98, the lower end of which is disposed above the infeed end of the tray 70. A feed roll 100 is disposed within the feed chamber and supported by the shaft 102. One end of the shaft projects through the side wall of the chamber and supports the sprocket 104 carrying the drive chain 106. This chain also engages the sprocket 108 secured to the shaft 66′. In this manner the feed roll 100 is operated to dispense particles of the material to be purified from the hopper onto the belt 68 at the infeed end of the tray 70 simultaneously as the belt is driven.

Mounted within the chamber adjacent the feed hopper and on the outfeed side of the latter, is at least one electron gun 110. In the embodiment illustrated a second gun 110′ is positioned adjacent the first for purposes explained more fully hereinafter. A preferred form of electron gun is illustrated in FIG. 4, wherein each is shown to comprise a hollow housing 112 which is cooled by water circulating through the inlet and outlet conduits 114, 116. This housing is elongated in the transverse direction of the feed belt 68, and houses an elongated resistivity heated cathode element 118 which extends substantially the full width of the feed belt. The bottom wall of the housing is incomplete, forming a transversely elongated opening which may be partially closed or, as illustrated, is completely closed by a transversely elongated second cathode element 120. Cathode 118 is isolated electrically from cathode 120 and is connected to a source of potential (not shown) which is negative with respect to cathode 120. This element 120 therefore is heated by bombardment of electrons from the resistively heated primary cathode 118 and since its entire emitting surface is at the same potential it functions as a uni-potential source of thermal electrons. This provides for the emission of electrons with substantially the same potential energy, and ultimately the same kinetic energy, in the beam. Since these electrons are emitted from the entire surface of the secondary cathode, there is formed a band of electrons across the transverse dimension of the feed belt. This bank of electrons bombards the granular material deposited upon the belt 68 as the latter moves in the outfeed direction, thus melting the material into slab form and simultaneously purifying it, in the manner described hereinbefore.

The second cathode 120 functions additionally to shield the primary cathode 118 from the material being melted. During melting of the material, considerable vaporization, ionization and spatter occur, and if these particles are permitted to deposit upon areas of the primary cathode, the resistance of those areas is decreased and the remaining areas thus are caused to burn out. On the other hand, such particles may accumulate upon the second cathode without deleterious effect.

As the melted slab M progresses in the outfeed direction, it is cooled and solidified by the water cooled tray 70. Since the transverse area of the material deposit under the influence of the electron beam band remains molten as the continuously formed slab moves in the outfeed direction, the process is substantially that of zone purification.

One or more additional electron guns may be disposed at intervals from the gun 110 in the outfeed direction, as illustrated by gun 110′, to provide further remeltings of the material with corresponding increase in purification. Certain of these guns may be utilized for final annealing of the purified material, as is well known.

Ultimately, the purified slab may be passed under the water cooled roll 122 which is supported at one end on the hollow shaft 124 which communicates at its inner end with the interior of the roll. The shaft is mounted on the chamber wall. A second hollow shaft 128 extends through the hollow shaft 124, also for communication with the interior of the roll, and these hollow shafts communicate with the cooling water inlet and outlet conduits 130 and 132, respectively.

The cooled slab then progresses outward through the vacuum seal 134 and the opening in the chamber wall, and thence between a pair of outfeed rolls 136, 138. Roll 136 is mounted upon the shaft 140 carrying the gear 142 which meshes with the drive gear 80. The other outfeed roll 138 is carried on the shaft 144 supported between the spaced arms 146 of a bell crank lever. This lever is mounted pivotally on the shaft 148. The other arm 150 of the bell crank lever supports an adjustment screw 152 which carries the resilient spring 154. The free end of this spring engages the wall of the chamber 60, and thus urges the bell crank lever resiliently in the direction of clockwise rotation (FIG. 4). Proper tension of the upper outfeed roll 138 upon the upper surface of the slab thus may be adjusted.

One or more openings in the chamber 60 may be provided for observation and maintenance. In the embodiment illustrated, one such opening is provided, and it is removably sealed by the hinged plate 156 and peripheral seal 158.

Referring now to the embodiment illustrated in FIGS. 6 and 7, the chamber 60 is evacuated through conduit 62 and houses the hopper 90, as in FIG. 4. The discharge outlet of the feed hopper 98 is disposed adjacent the infeed end of a rotary drum 160 mounted for rotation on a substantially horizontal axis within the bearing 162 projecting from the chamber wall. This bearing is hollow, and its interior 164 communicates with the cooling water inlet and outlet conduits 166 and 168, whereby the outward portion of the drum is cooled sufficiently to solidify the melted material being purified.

An electron gun 170 is supported by the chamber wall and is positioned adjacent the discharge outlet of the feed hopper 98, on the outfeed side of the latter. The gun serves to melt the particles dispensed from the hopper 90 onto the inner surface of the rotary drum 160 previously explained.

The drum is rotated by means of a worm gear 172 which meshes with the worm 174 carried by the shaft 176. A sprocket 178 on this shaft engages the chain 180 which also engages the sprocket 182 carried by the shaft 184 of the drive motor 186, and the sprocket 104 carried by the feed roll shaft 102.

Since the ultimate form of the purified material produced by this apparatus is in the form of a hollow cylinder C, a cylindrical plug 190 is initially fitted into the rotary drum 160 adjacent the cathode 170 to permit welding to said plug of the molten material being purified. This plug is secured to one end of an elongated shaft 192 which extends outwardly through the chamber extension 60', through a conventional vacuum seal 194. The outer end section of the shaft 192 is formed as a spiral screw 196 which is supported by a bearing 198 at the upper end of the pedestal 200. The bearing carries keys which slidably engage longitudinal keyways 202 in the screw 196, whereby to prevent rotation of the latter. Mounted on the pedestal adjacent the bearing is a worm gear 204 provided with an internal spiral bore which receives the spiral screw 196. The worm gear meshes with a worm 206 secured to the shaft 184. Thus, upon rotation of the worm gear, the spiral screw is caused to move rectilinearly.

At the beginning of the material purification, the molten material welds to the plug 190 and as the drum 160 rotates axially, the spiral screw 196 and attached plug moves in the outfeed direction. Thus, the purified material is formed in the shape of a hollow cylinder by the progressive spiral addition of melted and purified material to the infeed end of the cylinder. The procedure may be terminated when the desired length of cylinder has been formed.

Referring now to the embodiment illustrated in FIG. 8, the vacuum chamber 210 is removably sealed at one end by the cover plate 212 and associated vacuum seal 214, as by means of the releasable clamps 216. The cover plate supports a central bearing 218 in which is rotatably mounted the hollow shaft 220. The inner end of this shaft supports a hollow mandrel 222 for rotation within the chamber. A pair of hollow pipes 224 and 224' extends concentrically through the hollow shaft for communication with the interior of the mandrel, to provide for the circulation of cooling water through the inlet and outlet conduits 226, 228.

The hollow shaft supports a worm gear 230 which meshes with a worm 232 carried by the driven shaft 234 of the electric motor 236, mounted on the chamber cover. The chamber cover also supports the conduit 238 which communicates the interior of the chamber with an evacuating system.

It will be understood that the cover is secured firmly to a supporting base, and that it is the chamber 210 that is removable from the fixed cover.

An electron gun 240 is supported at the end wall of the chamber 210 and projects into the interior of the hollow mandrel 222. The gun is elongated and preferably of the type illustrated in FIG. 4, providing an elongated electron emitting cathode for producing an electron beam of substantially the same length as the interior of the mandrel.

The apparatus illustrated in FIG. 8 is adapted for the purification of material initially preformed in the shape of a hollow cylinder P having an outside diameter less than the inside diameter of the mandrel. In the case of refractory metal the cylinder is provided with a wall thickness preferably not exceeding one inch. The preform is placed within the hollow mandrel, after which the chamber is fitted over the mandrel with the electron gun disposed within and adjacent the lower portion of the preform for scanning the length of the latter. Thus, upon rotation of the mandrel, the preform rotates therewith and is subjected to electron bombardment over its entire length.

A second electron gun 242 may be mounted on the chamber end wall in position to extend between the mandrel and the upper portion of the preform. This second gun may serve to anneal or fuse the preform from the outer side, simultaneously with the treatment of the inner side.

The modification illustrated in FIG. 9 is substantially the same as that illustrated in FIG. 8, with the exception that the preform cylinder P' is dimensioned with an inner diameter greater than the outer diameter of the mandrel 244, and the electron gun 246 is positioned on the outer side of the mandrel adjacent the upper portion of the preform. The preform thus is subjected to electron bombardment of its outer surface, rather than its inner surface as provided by the gun 240 in the modification illustrated in FIG. 8.

By means of the method and apparatus described hereinbefore, maximum purification of materials of the class described is achieved while simultaneously providing the purified material in a form most convenient for ultimate use. In the case of refractory metals, by limiting the thickness of the purified slabs or cylinders to a maximum of about two inches, preferably one inch, optimum grain size is achieved with corresponding improvement in such characteristics as strength and ductility.

It will be apparent to those skilled in the art that various changes and modifications of the specific details of method and construction described hereinbefore, may be made without departing from the spirit of this invention and the scope of the appended claims.

Having now described my invention and the manner in which it may be used, what I claim as new and desire to secure by Letters Patent is:

1. The method of purifying material having a vapor pressure less than one atmosphere at its melting point, comprising arranging the material on a solid support in an inert atmosphere at subatmospheric pressure directing an electron beam onto a portion of the material on the support to heat said portion and form a molten zone, while maintaining the material on the support moving the support and beam relative to each other in a substantially horizontal plane to move the molten zone progressively over substantially the entire surface area of the material on the support, thereby withdrawing impurities from the mass of material into said moving molten zone, and while maintaining the material on the support resolidifying the material trailing the moving molten zone.

2. The method of claim 1 wherein a plurality of electron beams spaced apart in the direction of said movement are directed onto spaced portions of the material to heat said portions and form a plurality of spaced molten zones which move progressively relative to the dimension of the material parallel to said movement, thereby withdrawing impurities from the mass of material into said molten zones.

3. The method of claim 1 wherein the material is provided in the form of a hollow self-supporting cylinder which is rotated relative to an elongated electron beam which extends substantially the full length of the cylinder and is disposed substantially parallel to the axis of rotation of the cylinder, the elongated electron beam functioning to heat an elongated segment of the cylinder to form an elongated molten zone which moves progressively around the cylinder as the latter rotates.

4. The method of claim 1 wherein the material is continuously deposited in particulate form on a moving support and the deposited material is subjected to the bombardment of an electron beam to heat said deposited material and form a molten zone.

5. The method of claim 1 wherein the material is continuously deposited in particulate form on the inner surface of a rotating cylinder and the deposited material is subjected to the bombardment of an electron beam to heat said deposited material and form a molten zone, and wherein the melted material is continuously moved away from the beam to resolidify the material and form a cylinder thereof.

6. Apparatus for purifying material having a vapor pressure below one atmosphere at its melting point, comprising a chamber, evacuating means for providing the chamber with an inert atmosphere at sub-atmospheric pressure, horizontal supporting means in the chamber for supporting the material during melting and resolidifying of the latter, electron beam generating means positioned for directing an electron beam onto a portion of the material carried on the supporting means for heating said portion and forming a molten zone, and means mounting the supporting means and generating means for relative movement for moving the molten zone progressively over substantially the entire surface area of the material on the supporting means for withdrawing impurities from the mass of material into said moving molten zone, and cooling means associated with the supporting means for resolidifying the material trailing the moving molten zone.

7. The apparatus of claim 6 wherein the supporting means comprises a rotary mandrel adapted to support the material in the form of a hollow self-supporting cylinder, and the generating means is arranged to provide an elongated electron beam disposed substantially parallel to the rotary axis of the mandrel.

8. The apparatus of claim 6 wherein the supporting means comprises a moving conveyor and wherein feed means is provided for continuously depositing the material in particulate form on the conveyor.

9. The apparatus of claim 6 wherein the supporting means comprises a hollow rotary cylinder, feed means adjacent the infeed end of the cylinder for depositing the material in particulate form on the inner surface of the cylinder, plug means movable in the axial direction of the cylinder for initial welding thereto of the material being melted, and drive means for drawing the plug means and attached material in the outfeed direction of the cylinder as the latter is rotated, whereby to form a hollow cylinder of the material upon resolidification of the latter.

10. The apparatus of claim 6 wherein the electron beam generating means comprises a plurality of electron guns spaced apart in the direction of said relative movement for forming a plurality of spaced molten zones in the material on the supporting means.

References Cited by the Examiner

UNITED STATES PATENTS

| 2,189,786 | 2/1940 | Fischer | 313—305 |
| 2,715,196 | 8/1955 | Reid | 313—305 |
| 2,809,905 | 10/1957 | Davis et al. | 75—65 |
| 3,119,685 | 1/1964 | Hansley | 75—65 |
| 3,123,466 | 3/1964 | Crampton | 75—65 |
| 3,131,051 | 4/1964 | Hanks et al. | 75—65 |

DAVID L. RECK, *Primary Examiner.*

BENJAMIN HENKIN, *Examiner.*

H. W. CUMMINGS, F. F. SAITO, *Assistant Examiners.*